INVENTOR:
KENNETH RODRIGUE

BY: Calvin J. Laiche
ATTORNEY

United States Patent Office 3,484,850
Patented Dec. 16, 1969

3,484,850
UNLOADING MEANS
Kenneth Rodrigue, P.O. Box 968,
Thibodaux, La. 70301
Filed Oct. 31, 1967, Ser. No. 679,340
Int. Cl. B65g 67/24
U.S. Cl. 214—44        2 Claims

ABSTRACT OF THE DISCLOSURE

The present invention relates to means for unloading bulk material from trucks or trailers, or any transport equipment. More specifically, the instant invention is primarily directed to a hoisting apparatus for rapidly unloading sugar cane and the like from the bed of a truck or trailer equipped with a net or similar means upon which the bulk material to be unloaded is placed and thereafter unloaded by lifting one side of the net, the opposite side being secured to the side of the vehicle.

---

A particular object of the present invention is to provide an efficacious design of a sugar cane unloading apparatus whereby sugar cane can be unloaded from a vehicle equipped with a material retaining and unloading net whereby material can be rapidly unloaded from such vehicle which need not be equipped with special appurtenances nor critically positioned relative to the unloading apparatus.

The present means for unloading sugar cane or the like from a truck or transport equipment as described above, basically comprises an upwardly extended structure having an overhanging top portion under which a vehicle to be unloaded is positioned; hook means operably positioned on the overhanging side of the structure adapted for gripping the free side of the cane net; and hydraulic means comprising an elongated cylinder and piston assembly, the piston being operably connected to the hook means whereby the latter can be rapidly raised and lowered. Means in combination with the hook means are also provided for laterally positioning the hook means between the transport equipment to be unloaded and the structure. By virtue of the latter means, the equipment to be unloaded need not be critically parked with respect to the unloading apparatus, that is, the truck need not be positioned in a definite parallel location, but rather can be parked askew.

BACKGROUND OF THE INVENTION

The primary field of art to which the present hoisting apparatus pertains is that as embodied in Class 214, specifically Subclass 44, of the U.S. patent classification system.

In the refining of sugar cane and the like it is customary in the industry to haul harvested material to the mill, factory, or process location in trucks or trailers. A conventional vehicle employed in such an operation is a truck equipped with a trailer having an open top body which is provided with a net structure on which sugar cane to be hauled is loaded. The net is secured along one side of the truck and its opposite side is left free, the free side being generally provided with suitable structural members whereby the free side can be lifted upon gripping by a hoisting apparatus. In this manner, lifting of the free side dumps the cane or other material from the truck trailer to an unloading site adjacent to the trailer.

Heretofore, such sugar cane unloading apparatuses have employed cable winches for lifting the net that dumps the cane. Such means, besides being relatively slow in operation, has proven to be expensive both as to initial cost as well as its subsequent maintenance. Another problem accentuated by these relatively slower prior art hoists is the tilting of the truck being unloaded just prior to the point where the load is dumped. Earlier means to avoid this problem consisting of installing a retaining well adjacent the truck unloading site whereby the truck upon tilting would butt up or hit the wall thereby preventing it from overturning. Needless to say, this practice resulted in damage to the truck as well as presented a safety hazard.

Subsequent improvements in the art have been directed to various hold down means for holding the truck in a level position while the net is lifted. Typical of such improvements is that as shown and disclosed in U.S. Patent 2,936,913 which discloses an apparatus for unloading sugar cane comprising a clamp that is temporarily attached to the vehicle to be unloaded. The traveling hoist structure or hook is provided in the form of a tramway structure whereby it is guided along a definite path by a series of wheels rotatably positioned within suitable channel members. It has been found that this method and means of unloading sugar cane from a truck offers certain disadvantages for many operators in the sugar cane industry. For one, as shown in the patent, the truck must be fitted with specific appurtenances and devices to accommodate the particular hold down means. This suffers the disadvantage that many of these trucks are owned by small independent operators who are not prone to accommodate a particular processor. On the other hand, such vehicles come in so many different forms and shapes that it is very expensive to mass equip such vehicles by the processor at his expense. Another problem with truck hold down devices is that in the event the truck is moved while the hold down device is in position, both structures are damaged. Truck hold down devices additionally require that the truck be accurately positioned relative to the unloader. This requirement quite often results in considerable lost time in positioning the truck.

SUMMARY

The present invention basically provides sugar cane unloading means comprising an upwardly extended structure having an overhanging top portion under which equipment to be unloaded is positioned. Hook means is operably positioned on the overhanging side of the structure, which means is adapted for gripping the free side of the net within the equipment on which bulk material to be unloaded is positioned. Hydraulic means are also provided for raising and lowering the hook means, the hydraulic means comprising an elongated cylinder and piston assembly which is operably connected to the hook means whereby the latter can be rapidly raised and lowered. Means are also provided whereby the hook means can be laterally positioned to grip the net regardless of its spacing from the unloading boom. The hook positioning means is also adapted for orienting the hook means in an askew position to accommodate a non-parallel position of a mobile vehicle relative to the boom.

Among the distinct advantages and features of the present invention is the fact that mobile equipment to be unloaded need not be accurately positioned adjacent the boom. That is, the spacing between the boom and the truck can vary and the truck need not be positioned in a parallel relationship since the hook means can be oriented in as askew position to accommodate the position of the equipment. Additionally, the present invention dispenses with the need of a vehicle hold down device and its attendant problems inasmuch as it has been found that by lowering that side of the vehicle to which the unloading net is secured and upon rapidly lifting the load as made possible by way of the present invention, overturning of the vehicle is thus avoided.

Another distinct advantage of the present apparatus is the minimum amount of maintenance that is required since there are no cable winches utilized. Moreover, when the present device is inoperative, the various hydraulic means employed, specifically the piston and cylinder assemblies, are immersed in oil and thus protected from the elements. Consequently, in light of the above, the present unloading means is not only more versatile than similar prior art unloaders whereby considerable savings in operating expense is realized, but also results in additional savings by virtue of its lower initial cost and subsequent maintenance.

DESCRIPTION OF THE PREFERRED EMBODIMENT

Figure 1:
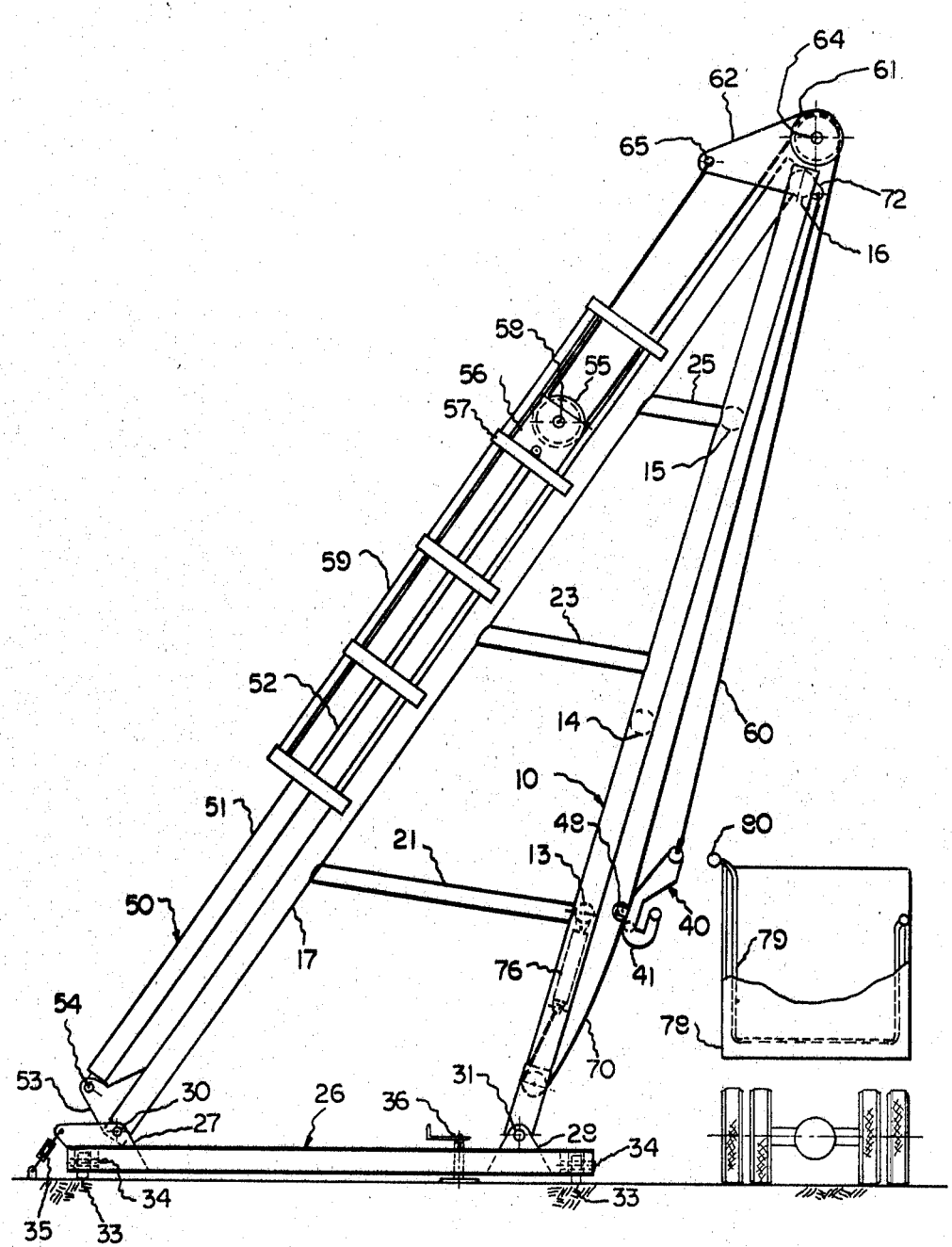
FIGURE 1 in the drawing represents a side elevation view of the present sugar cane unloading means showing its position relative to a truck to be unloaded.

The present unloading means preferably comprises the rectangular shaped inclined boom member 10 as shown in the drawings. The boom 10 is preferably constructed of conventional pipe and comprises the side members 11 and 12 which are united by the interconnecting members 13, 14, 15 and 16. The boom portion 10 is inclined toward an unloading site so as to provide an overhanging portion above the equipment to be unloaded. The boom 10 is positioned in this fixed relationship by virtue of the rearwardly extending support member 17 which is rigidly connected to the boom 10 by virtue of the interconnecting members 20 through 25 inclusive. The entire V-shaped structure thus defined is preferably constructed of conventional pipe fabricated by welding since such materials besides offering the requisite strength, are readily available, and offer a pleasing design.

Figure 2:
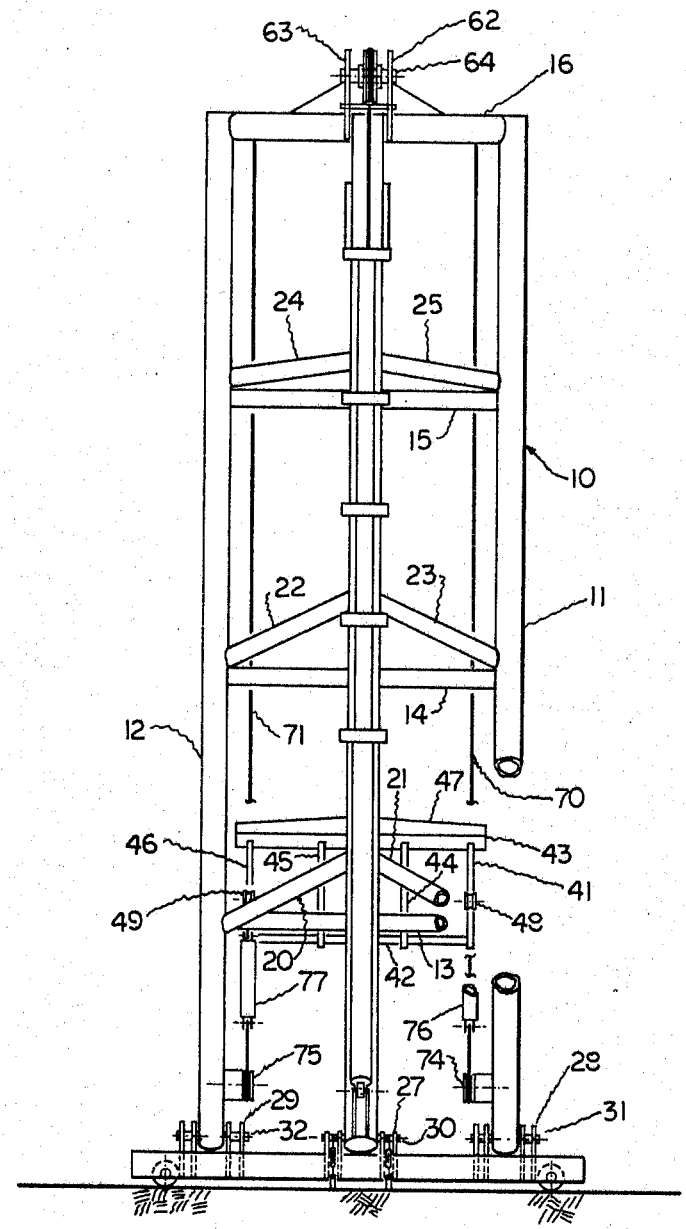
FIGURE 2 depicts a rear elevation view of the present sugar cane unloading means.

As shown in FIGURE 1, the boom 10 and the support member 17 are apexed at one end to form the overhanging portion. At their opposite ends, the members assume a tripod position. The V-shaped structure is preferably mounted upon the movable base plate 26. The base 26 further comprises the side support plates 27, 28, and 29. The V-shaped structure is attached to the base 26 via these plates by virtue of the pins 30, 31, and 32 as shown in FIGURE 2. The wheels 33 are rotatably mounted by virtue of the pin 34 within the structure of the base plate 26 are provided whereby the entire structure can be laterally positioned anywhere along the length of a truck or equipment to be unloaded. The base hold down means 35, preferably a turnbuckle, is provided for preventing the structure from overturning during an unloading operation. The screwjack 36 is provided for supporting the base plate 26 during an unloading operation to thereby prevent bending of the base 26. Of course, both the members 35 and 36 are disengaged before attempting to laterally shift the position of the unloader.

The hook means 40 for gripping a cane net comprises at least two of the hook shaped member 41 which are mounted in a fixed spaced apart parallel relationship by virtue of the connecting means 42 and 43. The hoisting hook 40 preferably comprises 4 of the individual hook member 41, specifically the additional members 44, 45, and 46 as shown in FIGURE 2. The hook members are welded to the members 42 and 43 which consists of conventional piping, the member 43 including the plate 47 by which the hoisting means 40 is lifted. In the embodiment of FIGURE 2, the pulleys 48 and 49 are provided which are rotatably mounted by suitable supporting means on the outer hook members 41 and 46 and function as described hereinafter.

The hoisting or hook means 40 is raised and lowered by operation of the hydraulic means 50. The hydraulic means comprises the hydraulic cylinder 51 and the piston 52, the length of these members determining the extent of travel of the hook means 40. The cylinder 51 is mounted upon the rearwardly supporting member 17 by virtue of the support plates 53 which in turn are connected to the cylinder 51 by the pin means 54. The hydraulic piston 52 is in turn is rotatably attached to the pulley means 55 by virtue of the connecting plates 56 (opposite side not shown). The piston 52 is connected to the plate 56 by the pin means 57 and the pulley 55 being rotatably mounted within the plates 56 by the pin means 58. The piston 52 and pulley 55 assembly are slidably mounted within the super structure 59 which includes suitable bracing for support upon the member 17.

The hydraulic assembly 50 is in turn connected to the hook means 40 by virtue of the cable means 60 which passes over the pulley 61 rotatably mounted at the top of the boom member 10 where it forms an apex with the member 17. The plates 62 and 63 are provided between which the pulley 61 is rotatably mounted by virtue of the pin means 64. The plates 62 and 63 also serve for fastening one end of the cable 60 to the structure, the cable 60 after passing over the pulley 61 being extended over and around the pulley 55 and fastened to the plates by virtue of the pin means 65.

In operation, the hook means 40 is raised by pressurizing the cylinder 51 whereupon the piston 52 is withdrawn within the cylinder thereby causing the cable 60 to lift the hook means 40.

The laterally position of the hook means 40 is controlled by virtue of the cables 70 and 71 which extend from the overhanging or top position of the boom 10, being attached thereto by virtue of the plates 72, downwards through the pulleys 48 and 49 respectively and over the sheeves 74 and 75 terminating in attachment io the hydraulic assemblies 76 and 77 respectively. The hydraulic assemblies 76 and 77 are in turn pivotedly fastened to the cross member 13. The cables 70 and 71 attached to the hydraulic assembiles at their piston ends whereby upon ejection of the individual pistons from within their respective cylinders, the amount of free play in the cables are thereby controlled.

It can be appreciated that by controlling the amount of payout of the cables 70 and 71, the lateral position of the hook means 40 can be controlled. Thus, where the payout is the same for both assemblies, the hook means 40 will be moved outwards parallel with respect to the boom 10. In other words, the longitudinal axis of the hoisting hook 40 as determined by the members 40 and 43 would remain parallel to, for example, the longitudinal axis of the interconnecting member 13. On the other hand, should the truck 78 be positioned askew relative to the unloader, then the hook means 40 can be oriented in an askew position by individually controlling the payout of the hydraulic means 76 and 77. Thus, it is not mandatory that the truck 78 be positioned in any given specific location on the unloading site nor located in an exact spaced apart parallel position relative to the boom 10 in order to grip the sugar cane unloading net 79 with the hoisting hook 40 which grips the net by the net hook plate 80.

In light of the foregoing discussion, it can be appreciated that by way of the present unloading means, sugar cane or the like can be rapidly unloaded from a hauling vehicle as described above in an efficacious manner heretofore not possible in the art. The net result is considerable savings in the time of unloading a vehicle both with regard to dumping the vehicle load as well as subsequently lining up and positioning the vehicle prior to unloading.

It will be apparent to one skilled in the art that considerable modifications and changes can be made in the instant invention without departing from its true spirit and scope. For example, the boom and related structure need not be constructed V-shaped, but rather can be rectangular or the like. Moreover, the boom 10 need not be inclined but rather oriented essentially perpendicular with an overhanging structure provided whereby the same results are realized. The V-shaped structure can also be permanently anchored to a given location by dispensing with the movable base 26. The hydraulic means 60 can also be reoriented within the structure and still achieve the same results. Moreover, the cables can additionally be dispensed with and hydraulic assemblies substituted in their place. For example, the hydraulic means 50 can be suspended by its end connected to the pin 54 from the apex of the structure, that is, where the pulley 61 is rotatably mounted and the outer end of the piston 52 pivotedly mounted to the hoisting means 40. Lateral positioning of the hook means 40 can also be accomplished directly by the use of hydraulic means attached thereto in lieu of utilizing a cable arrangement.

I claim:

1. Means for unloading sugar cane from a transport vehicle provided with a cane net structure secured to the vehicle on one side on which sugar cane is initially placed and thereafter unloaded by lifting the free side of the net whereby the sugar cane is dumped adjacent the vehicle, said means comprising:
   (a) a rectangular shaped inclined boom member which extends toward a vehicle to be unloaded;
   (b) a rearwardly extending support member united to said boom member (a), said support member being apexed with the top of said boom member and forming a tripod with the bottom of said boom member to thereby define a V-shaped structure;
   (c) base means on which said members (a) and (b) are mounted;
   (d) railway wheel means operably united to said base means (c) whereby the boom structure mounted upon said base means can be laterally positioned alongside a vehicle being unloaded;
   (e) members innerconnecting said boom member (a) and said support member (b);
   (f) hold down means for preventing the boom structure from tipping over during an unloading operation;
   (g) hook means operably positioned on the overhanging side of the boom structure and adapted for gripping the free side of an unloading net; said means including at least two hook-shaped members adapted for gripping an unloading net structure and means connecting said hook members in a fixed spaced apart parallel relationship;
   (h) hydraulic means for raising and lowering said hook means (g) comprising an elongated cylinder and piston assembly, said piston being operably connected to said hook means; said hydraulic means including means rigidly connecting said piston to said rearwardly extending support member (b) and hydraulic pump means and related conduit means for actuating said piston and cylinder assembly;
   (i) pulley means rotatably mounted on the outer traveling end of said hydraulic means (h);
   (j) pulley means rotatably mounted on the overhanging top portion of said inclined boom member (a);
   (k) cable means interconnecting said hydraulic means (h) and said hook means (g) whereby in cooperation with said pulley means said hook means can be raised and lowered; and
   (1) hook positioning means including at least two pulley means attached to said hook means (g) in a fixed spaced-apart relationship; at least two hydraulic assemblies, each having a piston and cylinder; and individual hook guide means in combination with said hydraulic assemblies, each guide cable being attached at one end to a respective piston of said hydraulic assemblies and at its other end to the top portion of said structure defined by the members (a) and (b) whereby in combination with said pulley means attached to said hook means, the lateral position of said hook means (g), at any elevation, can be oriented in any direction to accommodate the relative position of a vehicle to be unloaded by the individual and/or simultaneous control of said hydraulic assemblies.

2. Means for unloading sugar cane from a transport vehicle provided with a cane net structure secured to the vehicle on one side on which sugar cane is initially placed and thereafter unloaded by lifting the free side of the net whereby the sugar cane is dumped adjacent the vehicle, said means comprising:
   (a) an upwardly extending structure having an overhanging top portion under which a vehicle equipped with an unloading net is positioned for unloading;
   (b) hook means operably positioned on the overhanging side of said structure (a) adapted for gripping the free side of the net;
   (c) hydraulic means for raising and lowering said hook means (b) comprising an elongated cylinder and piston assembly, said piston being operably connected to said hook means (b); and
   (d) hook positioning means comprising:
      (1) at least two pulley means attached to said hook means (b) in a fixed spaced apart relationship;
      (2) at least two hydraulic assemblies, each having a piston and cylinder; and
      (3) individual hook guide cable means in combination with said hydraulic assemblies (d–2), each guide cable being attached at one end to a respective piston of said hydraulic assembly and at its other end to the top portion of said structure (a) whereby in combination with said pulley means (d–1), the lateral position of said hook means (b) at any elevation, can be oriented in any direction to accommodate the relative position of a vehicle to be unloaded by the individual and/or simultaneous control of said hydraulic assemblies (d–2).

References Cited

UNITED STATES PATENTS

| | | |
|---|---|---|
| 1,442,194 | 1/1923 | Thomas. |
| 2,936,913 | 5/1960 | Watt et al. _____ 214—44 |
| 3,129,821 | 4/1964 | Graham et al. |
| 3,403,796 | 10/1968 | Willett _____ 214—64 XR |

ROBERT G. SHERIDAN, Primary Examiner